Patented Dec. 22, 1942

2,305,714

UNITED STATES PATENT OFFICE 2,305,714

PEPSIN AND PROCESSES OF PREPARING THE SAME

Havard L. Keil, Chicago, Ill., assignor to Armour and Company, Chicago, Ill., a corporation of Illinois No Drawing. Application October 30, 1939, Serial No. 302,066

9 Claims. (Cl. 195—63)

This invention relates to processes of preparing pepsin, and it comprises processes wherein animal stomach linings, such as hog stomach linings, are mildly digested with hydrochloric acid under conditions avoiding inactivation of the pepsin contained therein, and without substantially changing the natural state of the mucin present, the digestion mixture then concentrated, chilled, and diluted with alcohol or acetone to separate out mucin and mucosa, the alcohol or acetone mixture having a pH of between about 2.5 and 3.5 and a specific gravity of about 0.94 and 0.96 at this point, the pepsin precipitated from the residual liquid solution by the further addition of alcohol or acetone such that the mixture has a specific gravity of about 0.89 to 0.91, and the pepsin recovered; it further comprises, as new materials a clear soluble pepsin mixture containing sodium acetate.

The recovery of pepsin from the lining of animal stomachs is a very old art. The conventional way includes a digestion of the animal material with an acid, such as hydrochloric. This digestion treatment is for the purpose of liberating the pepsin from the confines of the cells comprising the stomach linings. After digestion the mucosa is allowed to settle and is separated from the bulk of the digestion liquor from which pepsin can then be precipitated by the addition of sodium sulfate. The precipitate is finally purified by dialysis.

Pepsin prepared in this manner rarely, if ever, yields a clear solution when dissolved in water. The actual amount of pepsin obtained averages about 1% to 2% based on a calculated proteolytic value of 1:10,000 strength. Considerable pepsin is lost during the isolation procedure and the pepsin finally obtained is diluted with mucin, salts, and other impurities.

The art has long desired a simple method of recovering pepsin from stomach linings. What is wanted is a method not requiring close hydrogen ion concentration control and particularly adapted to plant operations on a large scale. The final product should have a high proteolytic value and it should give clear solutions when dissolved in water.

I have now discovered ways by which these desirable results can be achieved. My process is based in part upon the discovery that acid digestion mixtures containing mucosa and mucin in substantially their natural state, together with pepsin can be treated for the recovery of the pepsin by simply adding ethyl alcohol, commercial denatured ethyl alcohol or acetone, to the digestion liquor until the specific gravity thereof decreases to about 0.95. At this value, I have discovered, the mucin and mucosa separate out together in a stringy, filterable mass which, on standing, settles to the bottom of the treating tank and can be filtered from the supernatant pepsin-containing liquor. Upon further addition of alcohol or acetone to the filtrate thus obtained pepsin itself precipitates as a substantially pure product.

In addition to the use of alcohol or acetone as an agent for separating the mucin and mucosa my invention includes subjecting the stomach linings to such a mild acid digestion that the mucin and mucosa are substantially unaffected. In other words, after the digestion treatment these substances are in substantially their native state. It is not possible, however, to set out any specific details with respect to the amount of acid to be used for the digestion step in my process. This is because the amount required will depend upon characteristics of the stomach lining starting material. The digestion, however, is very mild.

Moreover, I find it advantageous to observe certain pH ranges during the precipitation of the mucin and mucosa, and the precipitation of the pepsin. These ranges are generally inherent when my process is practiced in the manner about to be more specifically described.

I have also discovered that pepsin, when admixed with water to which small amounts of sodium acetate have been added, yields clear solutions which can be dried to give admixtures of pepsin and sodium acetate again yielding clear solutions when dissolved for use. I have discovered that sodium acetate is a unique buffer for pepsin solutions regardless of the pH value of the solution.

I shall now give an example of how my invention can be practiced.

The first step in my process is the digestion of the animal stomach linings. Whole hog stomach linings, in the amount of one hundred pounds, are admixed with fifty pounds of water containing about 1300 cubic centimeters of hydrochloric acid. This hydrochloric acid is the commercial muriatic acid of commerce containing about 24% of hydrogen chloride. The digestion mixture is well stirred and allowed to stand overnight at room temperature. During the digestion the pH of the mixture rises and cannot, therefore, be accurately defined. The amount of acid added, however, is insufficient to affect the pepsin in any way.

The next morning fifty pounds of plain water are stirred into the mixture and the mixture warmed to about 43° C. in a water bath. Holding the mixture for about an hour at this temperature is sufficient to cause thorough digestion of the stomach linings.

The digestion process at this stage yields a mixture containing all of the available pepsin, none thereof having been broken down which would happen if the acid strength were markedly increased. This digestion step is much less drastic than hitherto practiced in the art.

I next concentrate the mixture to reduce its volume to about one-fourth. The aim in this step is to lower the water content to a point where the viscous liquid can be handled with a minimum of loss and also to effect a saving in the amount of alcohol necessary in subsequent steps. After concentration the mixture advantageously has a specific gravity of about 1.1 at 26° C. Concentration is in vacuum, the vacuum being about 28 inches of mercury and the temperature not over about 43° C. Those skilled in the art will understand that the concentration step should avoid destruction of the pepsin by observing the proper conditions.

The concentrate thus obtained contains the original pepsin, together with mucin and mucosa and the next step in my process is the separation of the mucin and mucosa therefrom. To this end the concentrate is chilled to a temperature of about 32° to 36° F. and cold ethyl alcohol, denatured alcohol or acetone is stirred in until the mixture has a specific gravity of about 0.94 to 0.96. At this point the hydrogen ion concentration is about pH 3. As long as the acidity is within the range of about pH 2.5 to 3.5, and the specific gravity is approximately 0.95, the mucin and mucosa will settle out in a ropy mass which can be readily filtered.

I have discovered a close relationship between the pH and the specific gravity of the solution at this point. These two factors are dependent upon each other to give a clear-cut separation of mucin and to prevent precipitation of pepsin along with the mucin. If the pH should be 4.5 or 5 then pepsin would precipitate along with the mucin. And at such a high pH the mucin and mucosa would not precipitate in a ropy, easily filtered mass, but rather as a finely divided flock which cannot be readily filtered.

Likewise, if the pH is maintained at 3 and the specific gravity is as high as 0.97 the pepsin will stay in solution but the mucin will not collect as a filterable mass. In order to insure a clean-cut separation of mucin and mucosa from the pepsin solution by the addition of alcohol it is desirable that the separation be conducted under conditions such that the pH is between 2.5 and 3.5, advantageously at 3, the specific gravity of the solution is between 0.94 and 0.96, advantageously 0.95, and the temperature should be between about 32° F. and 36° F. The temperature, however, is subject to wider variations, but if it is reduced to 20° F. some pepsin will precipitate with the mucin and if it is increased to 45° F. some pepsin will be lost due to alcoholic coagulation.

The amount of alcohol to be added at this stage can be determined readily by noting the specific gravity of the solution from time to time. If the digestion conditions are substantially identical with those described above the pH value of the mixture at this stage will be about 3 and need not be adjusted. If any adjustment is necessary then this can be done readily by the addition of acid or alkali, generally acid, as will be apparent to those skilled in the art. Sometimes the digestion process may give a concentrate having a pH somewhat above 3.5, so adjustment is generally achieved by the addition of acid, namely hydrochloric.

The precipitated mucin and mucosa are next filtered and the ropy mass of mucin and mucosa drained on a fine wire screen or burlap cloth to recover any residual mother liquor.

To the filtrate I then add more alcohol or acetone until the specific gravity reaches 0.90 with an optimum range of about 0.89 to 0.91. When the temperature is about 32° to 36° F., which condition I maintain, the pepsin precipitates out and settles to the bottom. By the addition of alcohol the pH of the solution automatically increases to about 4.5 to 5.5. Generally no adjustment of the pH either by the addition of acid or alkali, is necessary at this stage.

After the pepsin has settled over-night the supernatant liquid is pumped from the precipitate. Since there is still considerable alcoholic (or acetone) liquid in the pepsin precipitate it is advantageous to add about one pound of talcum thereto, stirring well, and filtering the mixture through canvas.

In the final steps of my process I mix the mixture of pepsin and talcum with about four gallons of distilled water at room temperature and again filter through canvas. The filtrate contains the pepsin thus freed of the insoluble talcum. This filtrate is then concentrated in vacuo to a volume of about 1.5 to 2 liters and about 8.6 grams of sodium acetate dissolved in a little water are added thereto. The sodium acetate, as stated above, insures a clear soluble pepsin product. The pepsin solution containing the sodium acetate is next spread on pans and dried in vacuum ovens maintained at about 130° F.

The dried product tests from 1:22,000 to 1:25,000 in proteolytic strength and the yield is about 2.8 to 3% based on a calculated strength of 1:10,000.

Ordinary commercial methods of pepsin manufacture give a yield of only about 1 to 2% based on a calculated proteolytic value of 1:10,000.

The amount of sodium acetate present can be varied over wide ranges and an excess does no harm. The sodium acetate, as stated, has the peculiar property of insuring clear pepsin solutions of high strength and this is a characteristic which I have found in no other buffer even in such salts as phosphates, borates, citrates and carbonates.

Having thus described my invention, what I claim is:

1. In the recovery of pepsin from acid digestion mixtures of animal stomach linings containing mucin and mucosa the steps which include adding a precipitant chosen from the group consisting of alcohol and acetone to the digestion mixture until the specific gravity thereof is reduced to approximately 0.95 to precipitate mucin and mucosa, separating off the mucin and mucosa, and then adding a further quantity of said precipitant to the mixture to decrease the specific gravity thereof to about 0.90 to precipitate pepsin therein.

2. The process of obtaining pepsin from animal stomach linings which comprises mildly digesting the stomach lining in water containing a small amount of acid without substantially changing the natural state of the mucin and mucosa associated with such linings, cooling the digestion mixture to a temperature of about 32° to 36° F., adding a precipitant chosen from the group consisting of cold alcohol and acetone thereto to precipitate mucin and mucosa without precipitating pepsin, separating the mucin and mucosa, and then precipitating pepsin from the residual liquid.

3. The process of obtaining pepsin from animal stomach linings which comprises subjecting the lining to a mild acid digestion without substantially changing the mucin and mucosa associated with such linings, precipitating mucin and mucosa from the digestion mixture by the addition of alcohol thereto, separating off the mucin and mucosa, and precitating the pepsin from the digestion mixture by the further addition of alcohol thereto.

4. The process of obtaining pepsin from hog stomach linings which comprises subjecting the stomach linings to a mild acid digestion, concentrating the acid digestion mixture, chilling the mixture, adding cold alcohol thereto to decrease the specific gravity of the mixture to about 0.95 to precipitate mucin and mucosa, separating off the mucin and mucosa, and then adding a further quantity of alcohol to decrease the specific gravity to about 0.90 to precipitate pepsin.

5. The process of obtaining pepsin from animal stomach linings which comprises mildly digesting the stomach lining in water containing a small amount of acid, concentrating the digestion mixture, adding a precipitant chosen from the group consisting of alcohol and acetone thereto to give a specific gravity of about 0.94 to 0.96 the mixture having a pH of between 2.5 and 3.5 to precipitate mucin and mucosa in an easily filtered mass, separating the mucin and mucosa, and adding a further quantity of said precipitant to the residual liquid until the specific gravity is about 0.89 to 0.91 to precipitate pepsin.

6. The process as in claim 5 wherein the precipitated pepsin is dissolved in water, sodium acetate added thereto, and the mixture dried.

7. A composition of matter comprising a mixture of pepsin and sodium acetate, the pepsin, in the absence of the sodium acetate, yielding water solutions which are not clear, and the sodium acetate acting to give clear solutions when said mixture is dissolved in water.

8. The process of obtaining pepsin from animal stomach linings which comprises subjecting the lining to a mild acid digestion without substantially changing the mucin and mucosa associated with such linings, adding alcohol to the digestion mixture while at a pH of from 2.5 to 3.5 to precipitate mucin and mucosa from the digestion mixture, separating off the mucin and mucosa, and adding alcohol to said mixture to precipitate pepsin therefrom.

9. The process of obtaining pepsin from animal stomach linings which comprises subjecting the lining to a mild acid digestion without substantially changing the mucin and mucosa associated with such linings, concentrating the digestion mixture, adding alcohol to said mixture to precipitate mucin and mucosa therefrom, separating off the mucin and mucosa, and adding further alcohol to said mixture to precipitate pepsin therefrom.

HAVARD L. KEIL.